United States Patent Office 3,641,189
Patented Feb. 8, 1972

3,641,189
DISPROPORTIONATION OF OLEFINES
Leonard Turner, Woking, Eric James Howman, Crowthorne, and Christopher Patrick Cadman Bradshaw, Sunbury-on-Thames, England, assignors to The British Petroleum Company Limited, London, England
No Drawing. Filed Aug. 26, 1965, Ser. No. 482,911
Claims priority, application Great Britain, Sept. 8, 1964, 36,722/64; Dec. 15, 1964, 50,985/64, Patent 1,054,864
Int. Cl. C07c 3/62, 11/02
U.S. Cl. 260—683 D
14 Claims

ABSTRACT OF THE DISCLOSURE

Acyclic mono olefins are disproportionated, i.e., converted into acyclic mono olefins of higher and lower carbon numbers than the feedstock olefin, in the presence of rhenium heptoxide on alumina.

---

This invention relates to a catalyst suitable for use in the disproportionation of acylic olefinic hydrocarbons and to a process for the disproportionation of acyclic olefinic hydrocarbons.

By the term "disproportionation" throughout this specification is meant the conversion of the feed hydrocarbon to a mixture of hydrocarbons having lower and higher carbon numbers than the feed hydrocarbons.

According to one aspect of the present invention there is provided a catalyst suitable for use in the disproportionation of acyclic olefins, the catalyst comprising a mixture of rhenium heptoxide and alumina.

Preferably the catalyst consists solely of rhenium heptoxide and alumina.

The catalyst preferably contains 0.1–40, most preferably 1 to 20 parts rhenium heptoxide per 100 parts alumina.

The preferred rhenium heptoxide catalyst may be prepared conveniently by mixing a solution of ammonium perrhenate, $NH_4ReO_4$, with alumina and heating to convert the perrhenate to the oxide.

The catalysts are activated before use by subjecting them to a thermal treatment, either in a stream of an inert gas such as nitrogen, carbon dioxide or helium, or preferably in a stream of air or oxygen followed by final treatment in an inert gas. Suitably the catalysts are treated in air at a temperature in the range 300°–900° C. for 1 minute to 20 hours and then under similar conditions in an inert gas such as nitrogen.

According to another aspect of the present invention there is provided a process for the disproportionation of an acyclic olefinic hydrocarbon which process comprises contacting an acyclic olefinic hydrocarbon with a disproportionation catalyst as hereinbefore described under conditions of temperature and pressure which effect disproportionation of the feed.

Acyclic olefins suitable as feeds include $C_{3-30}$ alkenes, preferably straight chain alkenes. The alkenes may be alpha, beta, or gamma etc. alkenes. Suitable alkenes include propylene, butene-1, butene-2, pentene-1, pentene-2, hexene-1, hexene-2, hexene-3, heptene-1, heptene-2, heptene-3, octene-1, octene-2, etc. Branched chain $C_{3-30}$ alkenes are also suitable feeds.

The conditions under which the process is carried out may vary with the composition of the feed and the desired product. Reaction temperatures may range from −20° C. to +500° C., temperatures in the range 20° C.–100° C. being preferred. As the temperature decreases from 150°–20° C. the selectivity of the reaction increases.

For example, using butene-1, at lower temperatures in the range 150° C.–20° C. the selectivity to ethylene and hexenes increases. At temperatures about room temperature, selectivities of 95% or higher may be achieved. Although disproportionation activity declines with reducing temperatures, significant activity is still achieved at temperatures as low as −20° C. The most preferred temperature range is 20° C. to 40° C. Reaction pressures may be 0 to 2000 p.s.i.g. Reaction times may vary between 0.01 second and 10 minutes, preferably between 0.1 second and 1 minute. Suitable olefin/catalyst weight ratios are in the range 1000:1 to 1:1.

Preferably the G.H.S.V. of the feedstock olefin is in the range 500–5000 vol./vol.

If desired the process may be effected in the presence of an inert diluent, for example a paraffinic or cycloparaffinic hydrocarbon.

The process may be carried out batch-wise or in a continuous manner, using the catalyst in the form of a fixed bed, a fluidized bed or a moving bed. If desired the disproportionation product may be separated into fractions and selected fractions, e.g., unconverted feed or fractions not having the desired carbon number may be recycled to the reactor.

The invention is illustrated by the following examples.

EXAMPLE 1

A catalyst was prepared by mixing 2.65 gms. of ammonium perrhenate in 10 ml. conductivity water with 10 gms. 30–60 mesh (BSS) alumina, drying the resultant paste at 100° C. and heating in dry air then dry nitrogen at 550° C. This catalyst contained 23.5 pts. (wt.) $Re_2O_7$ per 100 pts. $Al_2O_3$. An olefin feed containing 99.4% by weight of butene-1 was passed over the above catalyst at a G.H.S.V. of 1600 v./v. for 30 minutes at a temperature of 150° C. The total gaseous and liquid product were then analysed and the product distribution is shown in the table below.

| Carbon number of olefin: | Percent (molar) |
|---|---|
| 2 | 9.6 |
| 3 | 26.6 |
| 4: | |
|    Butene-1 and -2 | 23.4 |
|    Trans-butene-2 | 9.4 |
|    Cis-butene-2 | 5.3 |
| | 38.1 |
| 5 | 16.0 |
| 6 | 8.1 |
| 7 | 1.3 |
| 8 | 0.1 |

Percent disproportionation is 61.7%. Selectivity to $C_2$ plus $C_6$ is 29.3%

EXAMPLE 2

A catalyst was prepared by mixing ammonium perrhenate in conductivity water with 30–60 mesh (BSS) alumina, and drying the paste at 100° C. and then 300° C. for 3 hours. The catalyst was then activated by treating in air at 600° C. for 2 hours followed by treating in dry nitrogen for 1 hour at 600° C.

Butene-1 was passed over the catalyst at a G.H.S.V. of 1600 v./v. for 30 minutes at 25° C. and 50° C., the effluent gas being passed via a trap at 0° C. to a gasometer. The liquid and gaseous products of the runs are shown in the table below.

| Products (mole percent) | Temperature, °C. | |
| --- | --- | --- |
| | 25 | 50 |
| Ethylene | 22.2 | 18.6 |
| Propylene | 1.4 | 3.2 |
| Butene-1 and -2 | 62.1 | 59.0 |
| Pentenes | 0.3 | 2.0 |
| Hexenes | 14.0 | 16.7 |
| Heptenes | 0.1 | 0.3 |
| Octenes | | 0.2 |
| Percent disproportionation | 37.9 | 41.0 |
| Percent selectivity to $C_2$ and $C_6$ | 95.5 | 86.1 |

These examples illustrate the increasing selectivity of the reaction as the temperature is reduced from 150 to 25° C.

EXAMPLE 3

Two further runs were effected under analogous conditions as described in Example 2 except that the temperature was 0° C. and −20° C. respectively. The product distribution set out in the table below illustrates that even at such low temperatures, disproportionation does take place.

| Products (mole percent) | Temperature, °C. | |
| --- | --- | --- |
| | −20 | 0 |
| Ethylene | 1.9 | 4.3 |
| Propylene | 0.4 | 1.6 |
| Butene-1 | 95.4 | 88.0 |
| Butene-2 | Trace | 0.3 |
| Pentenes | | |
| Hexenes | 2.3 | 5.9 |
| Heptenes | | |
| Octenes | | |
| Percent disproportionation | 4.6 | 11.7 |

EXAMPLE 4

10 ml. of a 20 percent $Re_2O_7$ on $Al_2O_3$ (prepared from ammonium perrhenate as in previous examples) was shaken for 1 hour at 20° C. with 30 ml. of heptenes. The product has the composition:

| | Feed, wt. percent | Products, mol percent |
| --- | --- | --- |
| $C_4H_8$-1 | | 1.84 |
| $C_5H_{10}$-1 | | 2.65 |
| $C_5H_{10}$-2 | | 1.33 |
| $C_6H_{12}$-1 | | 0.11 |
| $C_6H_{12}$-2 | | 2.46 |
| $C_6H_{12}$-3 | | 21.2 |
| $C_7H_{14}$-1 and -2 | 8.06 | Trace |
| $C_7H_{14}$-3 | 91.9 | 40.6 |
| $C_8H_{16}$-1 | | (¹) |
| $C_8H_{16}$-2 | | 0.87 |
| $C_8H_{16}$-3 | | 3.18 |
| $C_8H_{16}$-4 | | 17.9 |
| $C_9H_{18}$ | | 7.75 |

¹ Not detected.

The heptenes conversion was 59.4 percent, and the selectivity to hexene-3 plus octene-4 was 66 percent.

We claim:

1. A process for the disproportionation of an acyclic olefinic hydrocarbon which process comprises contacting an acyclic olefinic hydrocarbon with a catalyst comprising a mixture of rhenium heptoxide and alumina under conditions of temperature and pressure which effect disproportionation of the feed and obtaining a mixture of hydrocarbons having lower and higher numbers of carbon atoms than the feed hydrocarbon.

2. A process according to claim 1 wherein the feed is a $C_{3-30}$ alkene.

3. A process according to claim 2 wherein the feed is a $C_{3-8}$ alkene.

4. A process according to claim 2 wherein disproportionation is effected at a temperature in the range −20° to +500° C.

5. A process according to claim 4 wherein disproportionation is effected at a temperature in the range 20° C. to 100° C.

6. A process according to claim 2 wherein the reaction pressure is in the range 0 to 1000 p.s.i.g.

7. A process according to claim 2 wherein the reaction time lies between 0.01 second and 10 minutes.

8. A process according to claim 7 wherein the reaction time lies between 0.1 second and 1 minute.

9. A process according to claim 2 wherein the olefin/catalyst weight ratio is in the range 1000:1 to 1:1.

10. A process according to claim 2 wherein the G.H.S.V. of the feedstock is in the range 500–1000 vol./vol.

11. A process as in claim 1 in which the catalyst consists essentially of from about 0.1 to 40 parts by weight of rhenium heptoxide per 100 parts by weight of alumina and the temperature of disproportionation is between about −20° C. and +500° C.

12. A process as in claim 11 wherein the catalyst consists solely of rhenium heptoxide and alumina.

13. A process as in claim 11 wherein the quantity of rhenium heptoxide is from about 1 to 20 parts by weight per 100 parts by weight of alumina.

14. A process as in claim 13 wherein the temperature of disproportionation is between about +20° C. and +100° C. at a pressure of between 0 and about 1000 p.s.i.g. and the reaction time is between 0.01 second and 10 minutes.

References Cited

UNITED STATES PATENTS

| 1,999,738 | 4/1935 | Pier et al. | 260—674 N |
| 2,614,137 | 10/1952 | Chenicek | 260—683 |
| 2,933,542 | 4/1960 | Bain et al. | 260—675.5 |
| 3,261,879 | 7/1966 | Banks | 260—683 |
| 3,285,845 | 11/1966 | Demeester | 252—461 |

DELBERT E. GANTZ, Primary Examiner

C. E. SPRESSER, JR., Assistant Examiner